United States Patent [19]
Schmidt

[11] Patent Number: 5,061,896
[45] Date of Patent: Oct. 29, 1991

[54] VARIABLE TRANSFORMER TO DETECT LINEAR DISPLACEMENT WITH CONSTANT OUTPUT AMPLITUDE

[75] Inventor: Samuel Schmidt, Enfield, Conn.

[73] Assignee: United Technologies Corporation, Hartford, Conn.

[21] Appl. No.: 484,454

[22] Filed: Feb. 16, 1990

Related U.S. Application Data

[63] Continuation-in-part of Ser. No. 772,273, Sep. 3, 1985, abandoned, and a continuation-in-part of Ser. No. 418,800, Oct. 4, 1989, abandoned, which is a continuation of Ser. No. 319,034, Mar. 6, 1989, abandoned.

[51] Int. Cl.$^5$ .................. G01B 7/14; H01F 21/06; H01F 27/28
[52] U.S. Cl. ................. 324/207.18; 324/207.24; 324/233; 336/136; 336/180; 336/224; 340/870.36
[58] Field of Search ............... 324/207, 208, 233, 228, 324/207.18, 207.24; 340/870.31, 870.32, 870.35, 870.36; 336/136, 180, 224; 242/7.03; 29/602 R

[56] References Cited

U.S. PATENT DOCUMENTS

| | | | |
|---|---|---|---|
| 2,621,324 | 12/1952 | Pan | 336/224 X |
| 2,929,017 | 3/1960 | Seaton | 336/136 X |
| 3,054,976 | 9/1962 | Lipshutz | 336/136 |
| 3,138,772 | 6/1964 | Persons, Jr. | 336/136 |
| 3,273,052 | 9/1966 | Langhain | 336/224 X |
| 4,134,065 | 1/1979 | Bauer et al. | 324/208 |
| 4,282,485 | 8/1981 | Pauwels et al. | 324/208 |
| 4,297,698 | 10/1981 | Pauwels et al. | 324/208 X |
| 4,388,568 | 6/1983 | Goseberg et al. | 336/136 X |
| 4,437,019 | 3/1984 | Chass | 336/136 X |
| 4,502,006 | 2/1985 | Goodwin et al. | 324/207.16 |
| 4,544,905 | 10/1985 | Best et al. | 336/136 |
| 4,723,446 | 2/1988 | Saito et al. | 324/207.17 X |
| 4,808,958 | 2/1989 | Hewitt et al. | 336/224 X |

FOREIGN PATENT DOCUMENTS

| | | | |
|---|---|---|---|
| 464064 | 3/1950 | Canada | 336/136 |
| 637974 | 3/1962 | Canada | 324/207 |
| 74603 | 5/1982 | Japan | 324/208 |
| 614077 | 12/1948 | United Kingdom | 336/136 |

OTHER PUBLICATIONS

"LPDT Preliminary Design Review" Cadillac Gage, May 22, 1985.
Yeaple, "Linear Position Transducer Changes Phase Instead of Amplitude", *Design News*, Nov. 5, 1984, pp. 180-181.

*Primary Examiner*—Kenneth Wieder
*Assistant Examiner*—Warren S. Edmonds

[57] ABSTRACT

A variable transformer is disclosed. The transducer includes a uniform pitch winding wound on a hollow bobbin with several continuously variable concentric coils wound over it with layers of insulation in between. The variable coils are wound in accordance with true trigonometric functions by adjusting the pitch between adjacent turns and reversing the direction of winding at each maximum pitch point corresponding to the zero crossover. The variable pitch coils are physically wound in quadrature with respect to a reference point on the bobbin. The transducer is finished by placing a magnetic shield over the bobbin which may include magnetic end washers. Lead wire connections are made and the entire unit is placed in a suitable housing. A moveable core, made from a highly permeable material, is placed inside the unit for slidably engaging the bobbin in its hollow. The variable pitch coils may then be excited by separate trigonometric function generators operating in quadrature and the output signal from the secondary has a constant amplitude which changes in phase with respect to one of the excitation sources in direct proportion to the position of the moveable magnetic core. Alternatively, the uniform pitch coil may be excited by a single phase AC source and the amplitude of the output signals from the variable pitch coils in conjunction with their phase relationship to the AC excitation source will indicate displacement of the core.

8 Claims, 3 Drawing Sheets

FIG.3
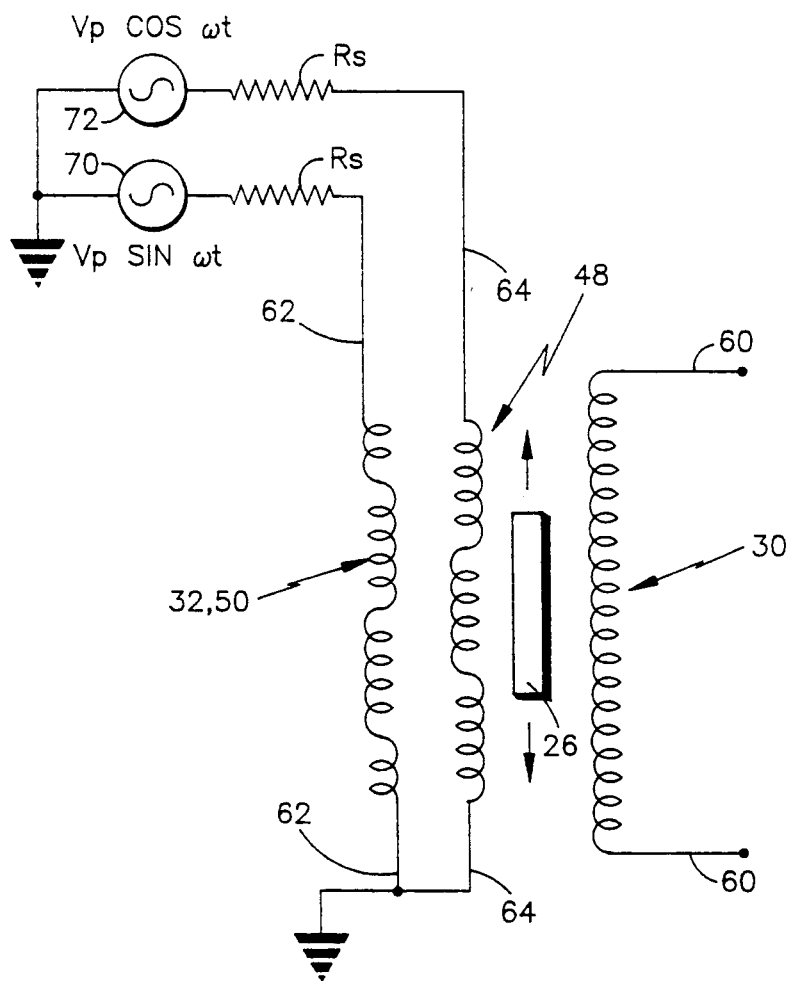
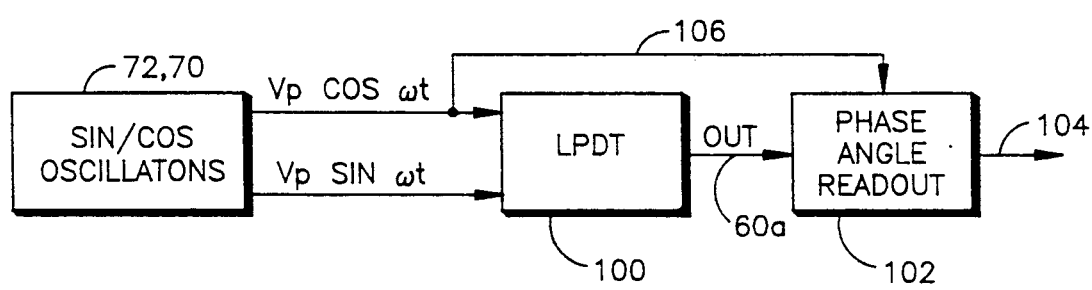
FIG.4

VARIABLE TRANSFORMER TO DETECT LINEAR DISPLACEMENT WITH CONSTANT OUTPUT AMPLITUDE

CROSS REFERENCE TO RELATED APPLICATIONS

This application is a continuation-in-part of my prior co-pending U.S. patent application Ser. No. 06/772,273 filed on Sept. 3, 1985, and is a continuation-in-part of my prior co-pending U.S. patent application Ser. No. 07/418,800, filed on Oct. 4, 1989, which in turn is a continuation of my prior co-pending U.S. patent application Ser. No. 07/319,034, filed on Mar. 6, 1989.

TECHNICAL FIELD

The present invention relates to a transducer for converting a rectilinear displacement into an electrical signal, and particulary to a differential transformer which produces a phase change in a constant amplitude output signal which is directly proportional to the displacement of a moveable magnetic core within the transformer.

BACKGROUND ART

A Linear Variable Phase Transformer With Constant Magnitude Output is disclosed in U.S. Pat. No. 4,282,485, granted to Pauwels et al, and assigned to the Pneumo Corporation. Pauwels discloses a bobbin upon which two primaries are mounted which are specially wound as different size donuts and apparently wound in-place according to sine and cosine functions. The bobbin is a long hollow cylinder for receiving a moveable magnetic core which is attached to an actuator rod the displacement of which is to be measured. The series of varying diameter donut shaped windings are wound onto the bobbin and are connected together. The first primary consists of a series of such donut shaped windings, all having the same inside diameter but having outside diameters which vary according to a cosine function. In other words, the diameters of the donuts along the length of the bobbin and transverse thereto will vary according to a cosine function. The first primary winding donuts are connected up in series in the finished unit. A second series of donuts is wound on top of the first set and constitutes the second winding. Both the internal and external diameters of this second series of donuts will vary since the inside diameter of each of the second series of donuts is wound on the outside diameter of a corresponding donut from the first primary. The diameters of the second set of donuts vary according to a sine function. The donuts of the first series are connected in series electrically, as are the donuts of the second series. A secondary winding of uniform thickness is wound on the very first layer of the bobbin underneath the donuts. The primaries are excited by separate sine and cosine signals in quadrature. The core combines the primary signals and induces an output signal in the secondary according the core position relative to the primaries. The signal has a constant magnitude and varies its phase with respect to one of the excitation signals used as a reference.

Thus, Pauwels discloses an LVPT including two segmental and generally coaxial primaries, each segment including a plurality of circumferential turns around the axis. The number of turns in each primary segment and the direction in which they are wound are determined in accordance with sine and cosine functions. Although the discrete nature of the windings makes the transducer somewhat difficult to fabricate and the resulting output signal has certain discontinuities and inaccuracies, there will be a high degree of linearity between the output signal phase and the core displacement. Nevertheless, it would be desirable to avoid some of the manufacturing difficulties due to the work involved in winding a large number of coil steps, including the application of the necessary insulation between the coils and also the overall wire management problem.

While differential transformers having multiple primaries with a single, uniform secondary have been utilized in many applications, it is sometimes necessary to transduce rectilinear motion in other ways. One such requirement is to convert rectilinear motion into multiple electrical signals with magnitudes which vary as trigonometric functions utilizing a single phase AC signal excitation source. The magnitude of the electric signal outputs of such a device vary in the form of sine or cosine functions while the input motion to be measured remains rectilinear motion. A resolver is an apparatus which has previously been used to provide a trigonometric electrical signal with respect to input displacement. A resolver utilizes a shaft which rotates to create the output sine or cosine electrical signal. The input measurement must be in the form of rotational or angular displacement. In order to measure rectilinear motion with a resolver, the rectilinear motion must be converted to angular displacement. Under these circumstances, mechanical gear devices have been utilized to convert rectilinear motion to angular motion. Unfortunately, the gear devices and the resolvers introduce error in the accuracy of the measurement. Also, they are unreliably, bulky, and heavy. A cost effective replacement for resolvers and their accompanying mechanics is, therefore, desirable.

DISCLOSURE OF THE INVENTION

An object of the present invention is to provide an improved differential transformer in which the phase of the output signal is directly proportional to the displacement of a magnetic core. Another object is for the transformer to provide a constant amplitude output throughout its operating range. Another object is to provide a transducer of optimum accuracy. A further object is to simplify the manufacture of a such a transducer, therefore reducing its cost.

Yet another object of the present invention is to provide an improved differential transformer which utilizes a single phase AC excitation source to provide an output signal the magnitude of which is a trigonometric sine/cosine function of the displacement of a magnetic core. Yet another object is for a differential transformer to provide two outputs, one a sine and the other a cosine waveform, where the ratio of the output magnitudes in conjunction with the phase relationship of the outputs with the single phase input signal will indicate displacement of the core independent of variations in the input signal.

According to the present invention a linear phase differential transformer with constant output amplitude includes, a uniform pitch secondary winding wound on a hollow bobbin tube made of non-magnetic, non-conductive material. A layer of insulation is applied over this coil. Two concentric primary coils are then wound over the secondary coil with layers of insulation in between. This may be done with the help of an automatic winding machine. The primary coils are wound in quadrature in accordance with true trigonometric functions by adjusting the pitch between adjacent turns and reversing the direction of winding at each maximum pitch point corresponding to the zero crossover. Various embodiments are possible, according to the teachings contained herein, but two inner layers of one primary coil wound in between or "sandwiched" between two outside layers of another primary coil, each layer of primary coil containing only one thickness of wire, is the simplest and the preferred embodiment. The "sandwich" approach is taken for the purpose of obtaining equal wire lengths and hence equal resistances in both primary coils. Of course, the secondary coil could as easily be placed outside the two primaries rather than inside. The transducer is finished by placing a magnetic shield casing (which may be made of a highly permeable material) over the bobbin for mounting the bobbin therein and for providing a magnetic path for coupling said primary windings to said secondary winding and which may include magnetic end washers. Lead wire connections are made and the entire unit is placed in a suitable housing. A movable core, made from a highly permeable material, is placed inside the unit for slidably engaging the bobbin in the hollow. Alternatively, the transducer may be constructed as a linear variable differential transformer with trigonometric output by having a single, uniform pitch primary and one or more secondaries wound in accordance with trigonometric functions as previously described. It should be understood that other layering techniques, various trigonometric functions, and more than two primaries or secondaries could be used. The basic teachings of the present invention permit various combinations of different types of primary windings all of which, however, will use the variable pitch technique discribed herein.

The output accuracy of the linear phase differential transformer of the present invention is enhanced because it follows true trigonometric functions. It provides constant output amplitude which is useful for avoiding variable scale factor, null points and also for providing a independent check on the health of the unit. It is easy to manufacture and does not involve the excessive amount of work involved in winding a large number of discrete coil steps. Overall wire management does not present any serious problems, as in the prior art. Alternatively, the output accuracy of the linear variable differential transformer embodiment of the present invention is enhanced because the amplitude of the voltage signals at the output vary as true sine and cosine functions of the displacement of the core. These signals can be used to calculate an angle which is a trigonometric function of the displacement of the core and is independent of the phase and peak voltage variations of the singular input signal used to excite the primary windings. In addition, it is inherently temperature insensitive. It can be hermetically sealed for operation in harsh environments and is of higher reliability than resolvers because there are fewer coils, none of which are moving. It is of simple construction and therefore has lower manufacturing costs. There are no contacts, bearings or brushes. The present invention has great design flexibility. It can be made to meet many scale factors and ranges, including multiple cycles of output periodicity. Thus, an improved linear phase differential transformer with constant output amplitude and a linear variable differential transformer with trigonometric output are provided.

These and other objects, features and advantages of the present invention will become more apparent in light of the detailed description of a best mode embodiment thereof, as illustrated in the accompanying drawing.

BRIEF DESCRIPTION OF THE DRAWING

FIG. 3 is a schematic diagram of an LPDT with excitation sources in quadrature; and FIG. 4 is an illustration of hardware which may be used to extract the phase information contained in the LPDT output signal.

BEST MODE FOR CARRYING OUT THE INVENTION

Figure 2:
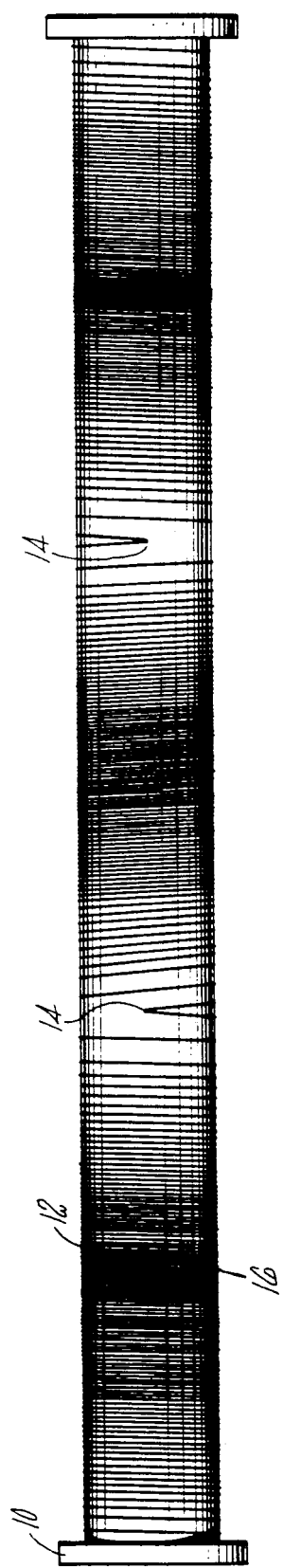
FIG. 2 is an illustration of a bobbin having a variable pitch winding wound in accordance with a trigonometric function, according to the present invention.

Referring first to FIG. 2, an illustration is provided which shows a hollow tubular bobbin 10 having an illustrative variable pitch winding 12 wound according to a trigonometric function such as sine or cosine. Thus, it will be seen that the spacing between adjacent coils varies according to a selected trigonometric function. It will also be noted that at the points of maximum pitch or minimum wire density 14 the direction of the winding is reversed in order to provide magnetic flux in the opposite direction. The particular winding shown in FIG. 2 consists of one and one half cycles of a cosine function. I.e., if the origin is taken to the left of center of the bobbin at 16 of FIG. 2, there will be found a minimum pitch condition which would correspond to a cosine function.

Of course, it will be understood by those skilled in the art that the flux reversal could instead be effected by using the same winding direction along the entire length of the bobbin and by cutting and reversing the hook-up of wires at the zero crossovers. This, however, would present certain manufacturing difficulties which are avoided using the winding reversal technique described in the preferred embodiment.

Figure 1:
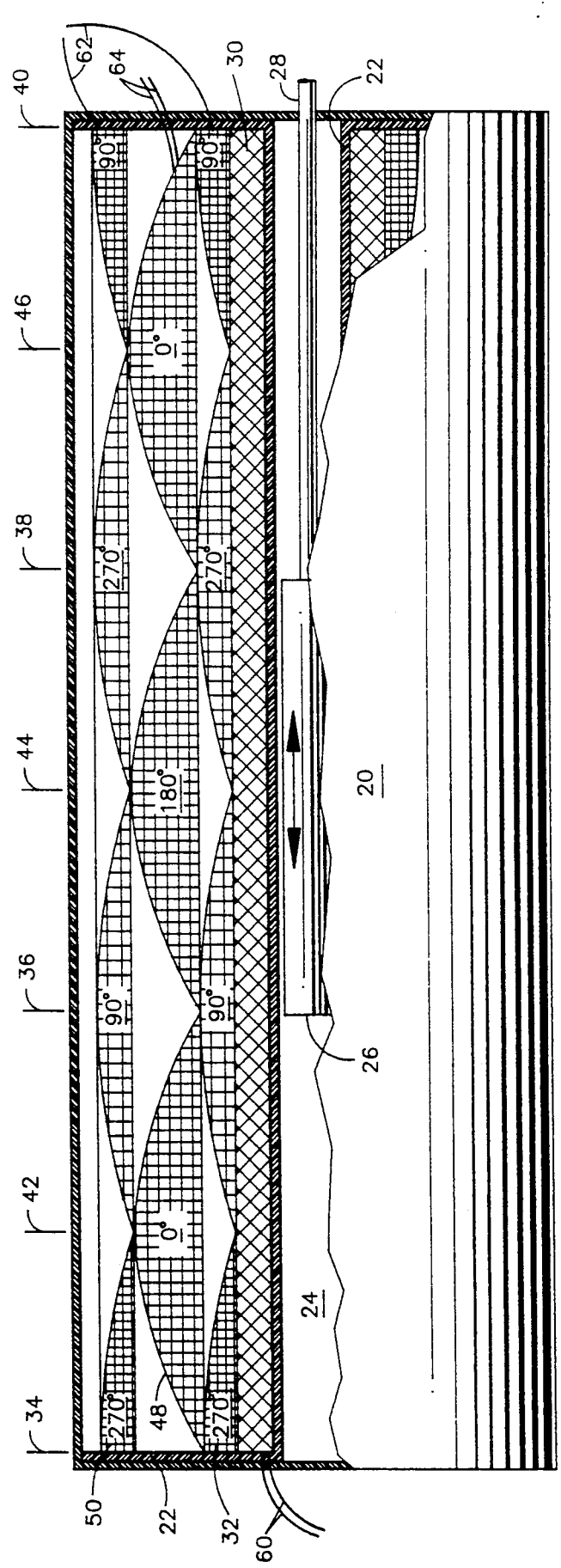
FIG. 1 is a stylized cross sectional "view" of a linear phase differential transformer with constant output amplitude in accordance with the present invention.

Referring now to FIG. 1, a stylized sectional "view" of a linear phase differential transformer with constant output amplitude, according to the present invention, is illustrated. The Figure is "stylized" in that it does not exactly represent what would be seen by actually cross sectioning an actual transformer. Instead of merely showing a cross section of actual windings, which would not convey as much information, there is instead shown a more descriptive illustration which shows the pitch variations in the primary and secondary windings as thickness variations according to what may be characterized as "rectified" trigonometric functions. The amplitude maximums correspond to points of maximum wire density (minimum pitch) which are also points of maximum flux.

An outside case 20 (which may be made of a highly permeable material) includes a bobbin 22 mounted therein having a hollow inner tube 24 for slidably engaging a highly permeable tubular core 26 which is capable of movement back and forth within the hollow tube according to movements in an attached actuator rod 28 the position of which is to be measured.

The bobbin 22 is first wound with a secondary winding 30 of uniform pitch which may be as thin as a single layer of wire. A first half layer 32 of a first primary variable pitch winding is wound according to a sine function (with respect to an arbitrary reference point 42. Thus, the points of maximum flux for this first layer of the first primary winding occur at reference points 34, 36, 38 and 40. Similarly, the points of minimum flux, i.e., maximum pitch occur at reference points 42, 44 and 46 for the first primary.

Next, a double layered variable pitch primary winding 48 is wound on top of the first primary winding 32. The second primary winding has its variable pitch 90° out of phase with that of the first primary winding. Thus, the second primary winding may be characterized as a cosine winding in conformance with the variations in the cosine trigonometric function. It has maximum flux points at reference points 42, 44 and 46. It should be understood that both layers of the second primary winding have their minimum and maximum pitch points lined up at the same reference points since the second layer overlays the first and must reinforce it. The fact that two layers of windings exist for the second primary winding is indicated generally by the maximum amplitude of the pitch variations for the second primary being twice as large as the maximum amplitude of the lower half of the first primary winding in the illustration. The reference point 42 may be thought of as the origin of the reference system so that it corresponds to zero degrees. In that case, reference point 34 corresponds to 270°, while reference point 36 corresponds to 90°. Similarly, reference point 44 corresponds to 180°, reference point 38 to 270°, reference point 46 to 0°, and reference point 40 to 90°.

A second half layer 50 of the first primary winding is now wound with a variable pitch identical to that of the first half 32. Thus, the maximum and minimum pitch points for this second half line up to and correspond with similar reference points as in the first half.

The secondary winding 30 has a pair of output leads 60. Similarly, the first primary winding 32, 50 has a pair of excitation leads 62 and the second primary winding has a pair of excitation leads 64.

These leads are shown schematically in FIG. 3 which also shows the primary and secondary coils schematically. The first primary 32, 50 is excited by an excitation source 70 which may be described by the function $V_p \sin \omega t$. The second primary coil 48 is excited by a second source 72 which is in quadrature with source 70 and may be described by the function $V_p \cos \omega t$. In series with each source is a resistance $R_s$ having a magnitude much greater than the impedance of the coils so as to make the source appear to be a constant current source. Of course, a constant current source could be used as well.

The device shown in FIG. 1 has a 360° range, end-to-end. It will be understood, of course, that the invention concepts disclosed herein permit a wide variety of devices having any selected range, including more than 360° (multiple cycle).

A short discussion, in mathematical terms, concerning the linear phase differential transformer of the present invention will now be presented. A list of symbols used in the expressions that follow with a short description of each will also be presented.

For the design as shown in FIG. 1 in which the core is moving in the positive direction to the right, the output of the secondary 30 will be an AC signal that, when compared to the signal in the cosine primary coil, will be characterized by:

$$V = CV_p \cos(\omega t + \theta)$$

When compared to the signal in the sine coil, it will be characterized by:

$$V = CV_p \sin(\omega t + \theta - \pi/2).$$

In these equations:

C—Transformation ratio.
$V_p$—Peak input voltage.
$\omega$—Frequency (radians per second).
t—Time (second).
K—Ratio of the maximum turn density in the primary coils to the turn density of the secondary coil.
N—Turn density of the secondary coil (turns per unit length).
n—Local turn density (turns per unit length).
P—Pitch of the secondary coil (length per turn).
p—Local pitch of the primary coil (length per turn).
S—Full scale stroke of the core (length).
t—Number of turns in a given length of bobbin.
X—Position of the center of the moveable core with respect to the point where the theoretical phase angle of the output is zero (length).
$\phi$—Full scale phase change (radians).
$\theta$—Theoretical phase angle of the output signal (radians).

Note: In these equations, $\theta$ is a theoretical phase angle. The actual phase angle produced by the transducer may be different due to constant phase shift inherent in the transformer.

The expression relating phase angle with displacement is:

$$\theta = \frac{\phi x}{S}$$

The turn distribution in the cosine winding will be defined by:

$$n = KN\cos\theta$$
$$= KN\cos\frac{\phi x}{S}$$

Similarly, the turn distribution in the sine winding will be defined by:

$$n = KN\sin\theta$$
$$= KN\sin\frac{\phi x}{S}$$

The total number of turns of primary winding in a given length of bobbin will be:

$$t = \int_{\theta_1}^{\theta_2} n\, d\theta$$

For the cosine winding, $$t = KN \int_{\theta_1}^{\theta_2} \cos\theta d\theta$$

$$= KN \int_{x_1}^{x_2} \cos\left(\frac{\phi x}{S}\right) dx$$

$$= \left. \frac{KNS}{\phi} \sin\left(\frac{\phi x}{S}\right) \right|_{x_1}^{x_2}$$

Similarly, for the sine winding, $$t = KN \int_{\theta_1}^{\theta_2} \sin\theta d\theta$$

$$= KN \int_{x_1}^{x_2} \sin\left(\frac{\phi x}{S}\right) dx$$

$$= \left. -\frac{KNS}{\phi} \cos\left(\frac{\phi x}{S}\right) \right|_{x_1}^{x_2}$$

The pitch of the wire at any point along the bobbin will be given by:

$$p = \frac{1}{n}$$

For the cosine winding, $$p = \frac{1}{KN \cos\left(\frac{\phi x}{S}\right)}$$

$$= \frac{\sec\left(\frac{\phi x}{S}\right)}{KN}$$

For the sine winding, $$p = \frac{1}{KN \sin\left(\frac{\phi x}{S}\right)}$$

$$= \frac{\csc\left(\frac{\phi x}{S}\right)}{KN}$$

FIG. 4 is an illustration of the manner in which the phase angle difference between an output signal on a line 60a from an LPDT 100 and one of the excitation signals from, e.g., the excitation sources of FIG. 3. A phase angle readout circuit 102 compares the phase of the two signals and provides a phase angle readout signal on a line 104 indicative thereof. This may be accomplished by, e.g., counting the number of clock pulses which occur between the zero crossings of the cosine signal on a line 106 and the output signal on the line 60a. Such techniques are well known in the art and will not be discussed further herein. See, for example, FIG. 2 of U.S. Pat. No. 4,282,485 and the accompanying discussion which is hereby expressly incorporated by reference.

The linear variable differential transformer embodiment of the present invention is accomplished by taking the transformer 20 and making the unifor mpitch coil 30 the primary and the variable pitch coils 36, 48, 50 the secondaries. Under this configuration, a single phase AC voltage source, such as either source 70 or 72 (but not both), is utilized to excite the primary and a phase sensitive voltmeter or resolver angular position indicator (either of which are not shown) is utilized to measure the magnitude of the output signals provided by the secondaries and their phase relationship to the excitation source 70 or 72. The input excitation signal 70 can be described as $V_p \sin(\omega t)$. The cosine coil output at leads 64 is $K_t V_p \sin(\omega t)\cos(K_s X)$. The sine secondary coil output at leads 62 is $K_t V_p \sin(\omega t) \sin(K_s X)$.

In these equations:

$V_p$—peak input voltage
$\omega$—frequency
$t$—time
$K_t$—transformation ratio
$K_s$—scale factor of the transducer
$X$—displacement of the core Disregarding the phase shift associated with the transformer action, the above equations demonstrate the instantaneous voltage of the output of the linear variable differential transformer is a trigonometric function of the displacement of the core with the electrical angle between the cosine and sine secondary coils characterized by:

$$\theta = \operatorname{Tan}^{-1} \frac{V_{sin}}{V_{cos}}$$

Also:

$$\theta = K_x X$$

Therefore:

$$X = \frac{1}{K_s} \operatorname{Tan}^{-1} \frac{V_{sin}}{V_{cos}}$$

Where:

Θ—electrical angle resulting from the resolution of the sine and cosine outputs
$V_{sin}$—RMS value of the sine output
$V_{cos}$—RMS value of the cosine output The above equations demonstrate the electrical angle resulting from the cosine and sine secondary coil outopts is a function of the displacement of the core and therefore it not affected by phase or peak voltage variations of the input excitation signal.

The phase relationship between the secondary windings need not be 90°, although 90° is preferred for simplicity. Also, the core and bobbin may be other than cylindrical, but the cylindrical shape is preferred. The bobbin may be conductive provided the material does not significantly reduce the efficiency of the device and care is taken to provide adequate electrical insulation. Thus, the linear variable differential transformer embodiment of the present invention provides a cost effective, highly accurate and reliable replacement for prior devices, such as mechanical resolvers or electrical devices requiring multiple phase excitation sources, which convert rectilinear motion into noe or more trigonometric electrical signals.

Although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. Apparatus, comprising:
   a nonconductive, nonmagnetic bobbin having a hollow tubular shape;
   a constant pitch secondary winding wound on said bobbin having a pair of output leads;
   a first variable pitch primary winding wound on said bobbin having a pitch which varies as a first trigonometric function with respect to a reference point and which has its wound direction reversed at the points of maximum pitch, except at the end points of said bobbin, said first winding having input leads for excitation by a first sinusoidal signal;
   a second variable pitch primary winding wound on said bobbin having a pitch which varies as a second trigonometric function with respect to said reference point and in quadrature with said first trigonometric function and which reverses its winding direction at the points of maximum pitch, except at the end points of said bobbin, said second winding having input leads for excitation by a second sinusoidal signal which has a fixed phase relation to said first sinusoidal signal; and
   a movable magnetic core for sliding engagement within said bobbin and for attachment to a moveable actuator the position of which is to be measured by means for determining the phase relation between the output signal on said output leads and either one of said first or second excitation signals.

2. The apparatus of claim 1, further comprising an additional first variable pitch primary winding and an additional second variable pitch primary winding similar in pitch winding, respectively, to said first and second variable pitch primary windings, said additional first winding connected in series to said first winding and layered adjacent thereto, said additional second winding connected in series to said second winding, said additional second winding and said second winding being layered on opposite sides of said adjacent layers of said first primary and said additional first winding such that the total wire length of said series connected first windings equals that of said series connected second windings and such that the pitch of said first windings overlap each other so as to vary in pitch identically with respect to said reference point and such that the pitch of said second windings overlap each other so as to vary indentically with respect to said reference point.

3. The apparatus of claim 1, further comprising a magnetic shield casing for mounting said bobbin therein and for providing a magnetic path for coupling said primary windings to said secondary winding.

4. A linear variable differential transformer comprising:
   a nonmagnetic bobbin having a hollow tubular shape;
   a uniform pitch primary winding wound on said bobbin having a pair of input leads for excitation by a single phase AC voltage source;
   a first variable pitch secondary winding wound on said bobbin having a pitch which varies continuously as a first trigonometric function and which reverses is winding direction at each point of maximum pitch, except at the end points of said bobbin, said first secondary winding having a pair of first output leads;
   a second variable pitch secondary winding wound on said bobbin having a pitch which varies continuously as a second trigonometric function out of phase with said first secondary winding and which reverses its winding direction at each point of maximum pitch, except at the end points of said bobbin, said second secondary winding having a pair of second output leads; and
   a moveable magnetic core slideably disposed within said bobbin and adapted to be attached to a moveable member the position of which is to be measured by means of detecting an electrical signal on said output leads.

5. A differential transformer according to claim 4, wherein said second trigonometric function is 90° out of phase with said first trigonometric function.

6. A differential transformer according to claim 4, wherein said secondary windings each comprise two winding segments connected in series, the pitch of each segment being identical to the pitch of the segment with which it is in series, one segment of one winding being adjacent to said bobbin, both segments of the other winding being adjacent to one another and between said segments of said one winding, whereby the wire length of said one winding is equal to the wire length of said other winding and the mean diameters of said windings are equal.

7. A differential transformer comprising:
   a nonmagnetic bobbin having a hollow tubular shape;
   a uniform pitch winding wound on said bobbin having a pair of first connecting leads;
   a first variable pitch winding wound on said bobbin having a pitch which varies continuously as a first trigonometric function and which reverses its winding direction at each point of maximum pitch, except at the end points of said bobbin, said first variable pitch winding having a pair of second connecting leads;
   a second variable pitch winding wound on said bobbin having a pitch which varies continuously as a second trigonometric function out of phase with said first variable pitch winding and which reverses its winding direction at each point of maximum pitch, except at the end points of said bobbin, said second variable pitch winding having a pair of third connecting leads; and
   a moveable magnetic core slideably disposed within said bobbin and adapted to be attached to a moveable member the position of which is to be measured by means of applying an electrical excitation signal to either said first connecting leads or to at least one of said second or third connecting leads and detecting an electrical signal on said first connecting leads if said excitation signal was applied to said second or third connecting leads or detecting an electrical signal on at least one of said second or third connecting leads if said excitation signal was applied to said first connecting leads.

8. Apparatus, comprising:
   a bobbin having a uniform pitch secondary coil wound thereon;
   a pair of variable pitch helical primary coils wound in quadrature on said bobbin; and
   a moveable magnetic core for movement within said bobbin for attachment to a moveable actuator the position of which is to be measured by means of determining the phase relation between an output signal provided by said secondary coil and either one of a pair of excitation sources applied in quadrature to said pair of primary coils.

* * * * *